United States Patent
Moore et al.

(10) Patent No.: US 10,862,761 B2
(45) Date of Patent: Dec. 8, 2020

(54) SYSTEM AND METHOD FOR MANAGEMENT OF DISTRIBUTED SYSTEMS

(71) Applicant: Dell Products L.P., Hopkinton, MA (US)

(72) Inventors: Kenneth Moore, Cork (IL); Collin Jay Miller, Celina, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/397,921

(22) Filed: Apr. 29, 2019

(65) Prior Publication Data

US 2020/0344130 A1    Oct. 29, 2020

(51) Int. Cl.
  *H04L 12/24*   (2006.01)
  *G06F 8/65*    (2018.01)
  *G06K 9/62*    (2006.01)

(52) U.S. Cl.
  CPC .............. *H04L 41/12* (2013.01); *G06F 8/65* (2013.01); *G06K 9/6276* (2013.01); *H04L 41/082* (2013.01); *H04L 41/147* (2013.01); *H04L 41/5045* (2013.01)

(58) Field of Classification Search
  CPC ....... G06F 8/65; G06K 9/6276; H04L 41/082; H04L 41/12; H04L 41/147; H04L 41/5045
  See application file for complete search history.

(56) References Cited

U.S. PATENT DOCUMENTS

| | | |
|---|---|---|
| 5,483,637 A | 1/1996 | Winokur et al. |
| 5,867,714 A | 2/1999 | Todd et al. |
| 6,012,152 A | 1/2000 | Douik et al. |
| 6,205,409 B1 | 3/2001 | Zvonar |
| 6,317,028 B1 | 11/2001 | Valiulis |
| 6,473,794 B1 | 10/2002 | Guheen et al. |
| 6,606,744 B1 | 8/2003 | Mikurak |
| 6,633,782 B1 | 10/2003 | Schleiss et al. |
| 6,742,141 B1 | 5/2004 | Miller |
| 6,795,935 B1 | 9/2004 | Unkle et al. |
| 6,871,224 B1 | 3/2005 | Chu et al. |
| 7,103,874 B2 | 9/2006 | McCollum et al. |
| 7,222,127 B1 | 5/2007 | Bern et al. |
| 7,334,222 B2 | 2/2008 | Keller |
| 7,370,102 B1 | 5/2008 | Chu et al. |
| 7,490,073 B1 | 2/2009 | Qureshi et al. |
| 7,500,142 B1 | 3/2009 | Cowart et al. |

(Continued)

OTHER PUBLICATIONS

"Dell DRAC—Wikipedia"; XP055602141; Mar. 23, 2018; https://en.wikipedia.org/w/index.php?title=Dell_DRAC&oldid=831957421.

(Continued)

*Primary Examiner* — George C Neurauter, Jr.

(74) *Attorney, Agent, or Firm* — Chamberlain, Hrdlicka, White, Williams, & Aughtry

(57) ABSTRACT

An architecture analyzer for managing a distributed system includes persistent storage and an entity identifier. The persistent storage stores a profile repository. The entity identifier obtains entity characteristics associated with an entity. The entity identifier performs an entity analysis of the entity characteristics using the profile repository to predict at least one candidate device type for the entity. The entity identifier remediates the entity based on the at least one candidate device type for the entity.

20 Claims, 18 Drawing Sheets

(56) References Cited

U.S. PATENT DOCUMENTS

| | | |
|---|---|---|
| 7,516,362 B2 | 4/2009 | Connelly et al. |
| 7,536,595 B1 | 5/2009 | Hiltunen et al. |
| 7,757,124 B1 | 7/2010 | Singh et al. |
| 7,831,693 B2 | 11/2010 | Lai |
| 7,886,031 B1 | 2/2011 | Taylor et al. |
| 7,987,353 B2 | 7/2011 | Holdaway et al. |
| 8,001,527 B1 | 8/2011 | Qureshi et al. |
| 8,166,552 B2 | 4/2012 | Prafullchandra et al. |
| 8,386,930 B2 | 2/2013 | Dillenberger et al. |
| 8,401,982 B1 | 3/2013 | Satish et al. |
| 8,583,769 B1 | 11/2013 | Peters et al. |
| 8,639,798 B2 | 1/2014 | Akiyama et al. |
| 8,774,054 B2* | 7/2014 | Yin ................ H04L 41/0893 370/254 |
| 8,826,077 B2 | 9/2014 | Bobak et al. |
| 8,868,987 B2 | 10/2014 | Wagner |
| 8,874,892 B1 | 10/2014 | Chan et al. |
| 8,938,621 B2 | 1/2015 | Mao et al. |
| 8,995,439 B2 | 3/2015 | Field |
| 9,122,501 B1 | 9/2015 | Hsu et al. |
| 9,122,739 B1 | 9/2015 | Yadwadkar et al. |
| 9,201,751 B1 | 12/2015 | Muthirisavenugopal et al. |
| 9,225,625 B1 | 12/2015 | He et al. |
| 9,229,902 B1 | 1/2016 | Leis et al. |
| 9,278,481 B2 | 3/2016 | Hull |
| 9,355,036 B2 | 5/2016 | Beard et al. |
| 9,384,082 B1 | 7/2016 | Lee et al. |
| 9,542,177 B1 | 1/2017 | Johansson et al. |
| 9,594,620 B2 | 3/2017 | Xia et al. |
| 9,729,615 B2 | 8/2017 | Nair |
| 9,864,634 B2 | 1/2018 | Kenkre et al. |
| 9,898,224 B1 | 2/2018 | Marshak et al. |
| 9,999,030 B2* | 6/2018 | Gu ................ H04L 67/1095 |
| 10,048,996 B1 | 8/2018 | Bell et al. |
| 10,057,184 B1 | 8/2018 | Prahlad et al. |
| 10,097,620 B2 | 10/2018 | Reddy et al. |
| 10,514,907 B2 | 12/2019 | Chaganti et al. |
| 2001/0044782 A1 | 11/2001 | Hughes et al. |
| 2003/0149919 A1 | 8/2003 | Greenwald et al. |
| 2004/0078683 A1 | 4/2004 | Buia et al. |
| 2004/0088145 A1 | 5/2004 | Rosenthal et al. |
| 2004/0177168 A1 | 9/2004 | Alabraba et al. |
| 2004/0177354 A1 | 9/2004 | Gunyakti et al. |
| 2004/0225381 A1 | 11/2004 | Ritz et al. |
| 2004/0250260 A1 | 12/2004 | Pioso |
| 2005/0033770 A1 | 2/2005 | Oglesby et al. |
| 2005/0078656 A1 | 4/2005 | Bryant et al. |
| 2005/0120112 A1 | 6/2005 | Wing et al. |
| 2005/0144151 A1 | 6/2005 | Fischman et al. |
| 2005/0144188 A1 | 6/2005 | Bailey et al. |
| 2006/0117212 A1 | 6/2006 | Meyer et al. |
| 2006/0149408 A1 | 7/2006 | Speeter et al. |
| 2006/0178864 A1 | 8/2006 | Khanijo et al. |
| 2006/0179116 A1 | 8/2006 | Speeter et al. |
| 2006/0235962 A1 | 10/2006 | Vinberg et al. |
| 2007/0143851 A1 | 6/2007 | Nicodemus et al. |
| 2007/0202469 A1 | 8/2007 | Davidson |
| 2008/0037532 A1 | 2/2008 | Sykes et al. |
| 2008/0065700 A1 | 3/2008 | Lim |
| 2008/0201470 A1 | 8/2008 | Sayama |
| 2008/0228755 A1 | 9/2008 | Haga et al. |
| 2008/0262860 A1 | 10/2008 | Schneider et al. |
| 2009/0012805 A1 | 1/2009 | Schnell et al. |
| 2009/0113248 A1 | 4/2009 | Bock et al. |
| 2009/0165099 A1 | 6/2009 | Eldar et al. |
| 2009/0183010 A1 | 7/2009 | Schnell et al. |
| 2009/0260071 A1 | 10/2009 | Sadovsky et al. |
| 2009/0282283 A1 | 11/2009 | Sakakura et al. |
| 2010/0024001 A1 | 1/2010 | Campbell et al. |
| 2010/0057677 A1 | 3/2010 | Rapp et al. |
| 2010/0180221 A1 | 7/2010 | Cloward et al. |
| 2010/0229022 A1 | 9/2010 | Anand et al. |
| 2010/0306489 A1 | 12/2010 | Abts et al. |
| 2010/0312522 A1 | 12/2010 | Laberge et al. |
| 2010/0318487 A1 | 12/2010 | Marvasti |
| 2010/0325493 A1 | 12/2010 | Morimura et al. |
| 2011/0078428 A1 | 3/2011 | Hamid |
| 2011/0093703 A1 | 4/2011 | Etchegoyen |
| 2011/0270482 A1 | 11/2011 | Holzer |
| 2011/0289342 A1 | 11/2011 | Schaefer et al. |
| 2011/0289343 A1 | 11/2011 | Schaefer et al. |
| 2011/0302305 A1 | 12/2011 | Morimura et al. |
| 2012/0041976 A1 | 2/2012 | Annapragada |
| 2012/0083917 A1 | 4/2012 | Zhou et al. |
| 2012/0110142 A1 | 5/2012 | Montagna et al. |
| 2012/0144244 A1 | 6/2012 | Dan et al. |
| 2012/0150926 A1 | 6/2012 | Adkins et al. |
| 2012/0166142 A1 | 6/2012 | Maeda et al. |
| 2012/0182151 A1 | 7/2012 | Tong et al. |
| 2012/0233216 A1 | 9/2012 | Lim |
| 2012/0265872 A1 | 10/2012 | Chilton |
| 2012/0271927 A1 | 10/2012 | Shakirzyanov et al. |
| 2012/0331526 A1 | 12/2012 | Caudle et al. |
| 2013/0151975 A1 | 6/2013 | Shadi et al. |
| 2013/0185667 A1 | 7/2013 | Harper et al. |
| 2013/0257627 A1 | 10/2013 | Rafael |
| 2013/0317870 A1 | 11/2013 | Franco et al. |
| 2013/0326029 A1 | 12/2013 | Flynn |
| 2014/0069291 A1 | 3/2014 | Yang et al. |
| 2014/0082417 A1 | 3/2014 | Barton et al. |
| 2014/0115176 A1 | 4/2014 | Kamboh et al. |
| 2014/0245085 A1 | 8/2014 | Halverson et al. |
| 2014/0281675 A1 | 9/2014 | Sreenivasan et al. |
| 2014/0304399 A1 | 10/2014 | Chaudhary et al. |
| 2014/0304402 A1 | 10/2014 | Prakash et al. |
| 2014/0324276 A1 | 10/2014 | Weaks |
| 2014/0344101 A1 | 11/2014 | Collet et al. |
| 2015/0117174 A1 | 4/2015 | Alber et al. |
| 2015/0120359 A1 | 4/2015 | Dongieux |
| 2015/0149822 A1 | 5/2015 | Coronado et al. |
| 2015/0256394 A1 | 9/2015 | Palmer et al. |
| 2016/0042288 A1 | 2/2016 | Cohen et al. |
| 2016/0048611 A1 | 2/2016 | Cox et al. |
| 2016/0057009 A1 | 2/2016 | Kadayam et al. |
| 2016/0110240 A1 | 4/2016 | Reger et al. |
| 2016/0112504 A1 | 4/2016 | Mathur et al. |
| 2016/0173690 A1 | 6/2016 | Perez et al. |
| 2016/0294643 A1* | 10/2016 | Kim ................ H04L 67/16 |
| 2016/0302323 A1 | 10/2016 | Gosselin |
| 2017/0017881 A1 | 1/2017 | Langley et al. |
| 2017/0032091 A1 | 2/2017 | Rudorfer et al. |
| 2017/0085644 A1 | 3/2017 | Chouhan et al. |
| 2017/0094003 A1 | 3/2017 | Gahlot et al. |
| 2017/0206128 A1 | 7/2017 | Anderson et al. |
| 2017/0242740 A1 | 8/2017 | Bell et al. |
| 2017/0339005 A1 | 11/2017 | Yuan et al. |
| 2018/0025166 A1 | 1/2018 | Daniel et al. |
| 2018/0034709 A1 | 2/2018 | Chen et al. |
| 2018/0041388 A1* | 2/2018 | Moens ............ H04L 41/0806 |
| 2018/0285009 A1 | 10/2018 | Guim Bernat et al. |
| 2018/0302277 A1* | 10/2018 | Shimamura ...... H04L 41/5054 |
| 2018/0321934 A1 | 11/2018 | Chaganti et al. |
| 2018/0322019 A1 | 11/2018 | Stowell et al. |
| 2018/0329579 A1 | 11/2018 | Kaimal et al. |
| 2019/0123985 A1 | 4/2019 | Rao et al. |
| 2019/0149408 A1* | 5/2019 | Li ................ H04L 41/0886 709/223 |
| 2019/0182105 A1 | 6/2019 | Stephens et al. |
| 2019/0303137 A1 | 10/2019 | Chaganti et al. |
| 2019/0306013 A1 | 10/2019 | Ali et al. |
| 2019/0324841 A1 | 10/2019 | Patel et al. |
| 2020/0079403 A1 | 3/2020 | Setiawan et al. |

OTHER PUBLICATIONS

"Dell EMC OpenManage Essentials Version 2.3: User's Guide"; XP055602720; Oct. 1, 2017; https://topics-cdn.dell.com/pdf/openmanage-essentials-v23 users-guide en-us.pdf.

"Integrated Dell Remote Access Controller 8 (iDRAC8): Version 2.05.05.05 User's Guide"; Dell Inc.; 2014.

Doug Iler et al.; "Introducing iDRAC8 with Lifecycle Controller for Dell 13th Generation PowerEdge Servers"; Dell Inc., A Dell Deployment and Configuration Guide; Sep. 2014.

(56) References Cited

OTHER PUBLICATIONS

Duncan Tweed; "Baseline configuration"; BMC Software, Inc.; Apr. 7, 2015; retrieved from https://bmc.com/.
Duncan Tweed; "BMC Atrium Discovery User Guide"; BMC Software, Inc.; Mar. 2014; retrieved from https://bmc.com/.
Masoom Parvez; "AutomaticGroup Node"; BMC Software, Inc.; 2014; retrieved from https://bmc.com/.
Zhengyu Liang et al.; "ClusterProbe: An Open, Flexible and Scalable Cluster Monitoring Tool"; IEEE Computer Society International Workshop on Cluster Computing; pp. 261-268; 1999.
Coulouris et al.; "Distributed Systems: Concepts and Design, Fifth Edition"; Addison-Wesley; pp. 37-61; 2012 (27 pages).

* cited by examiner

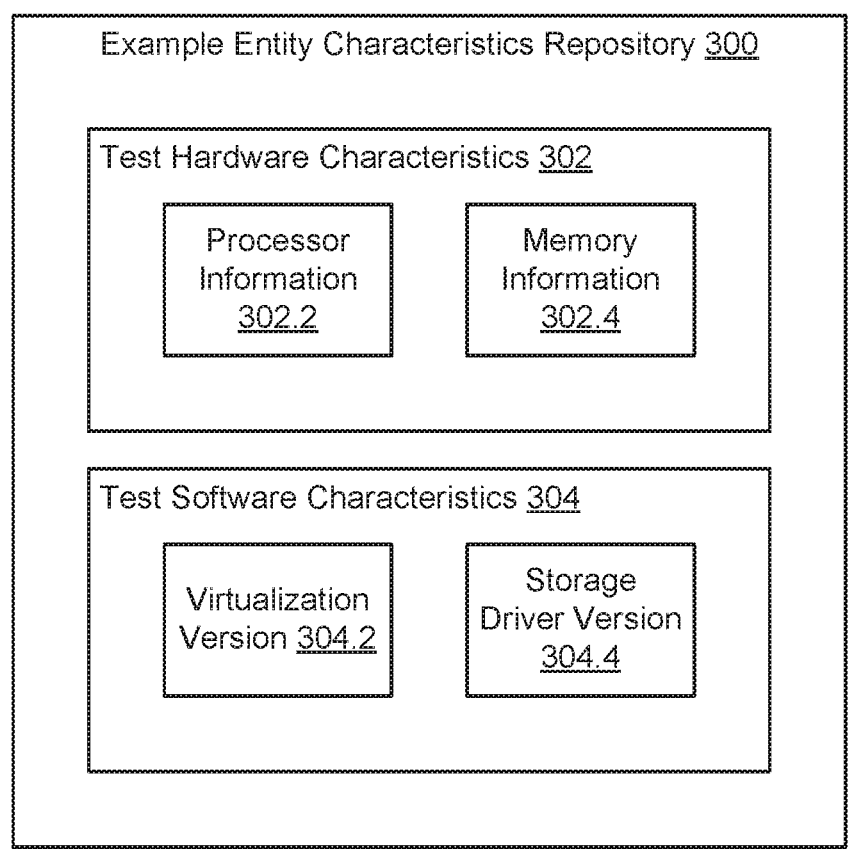
FIG. 3.1

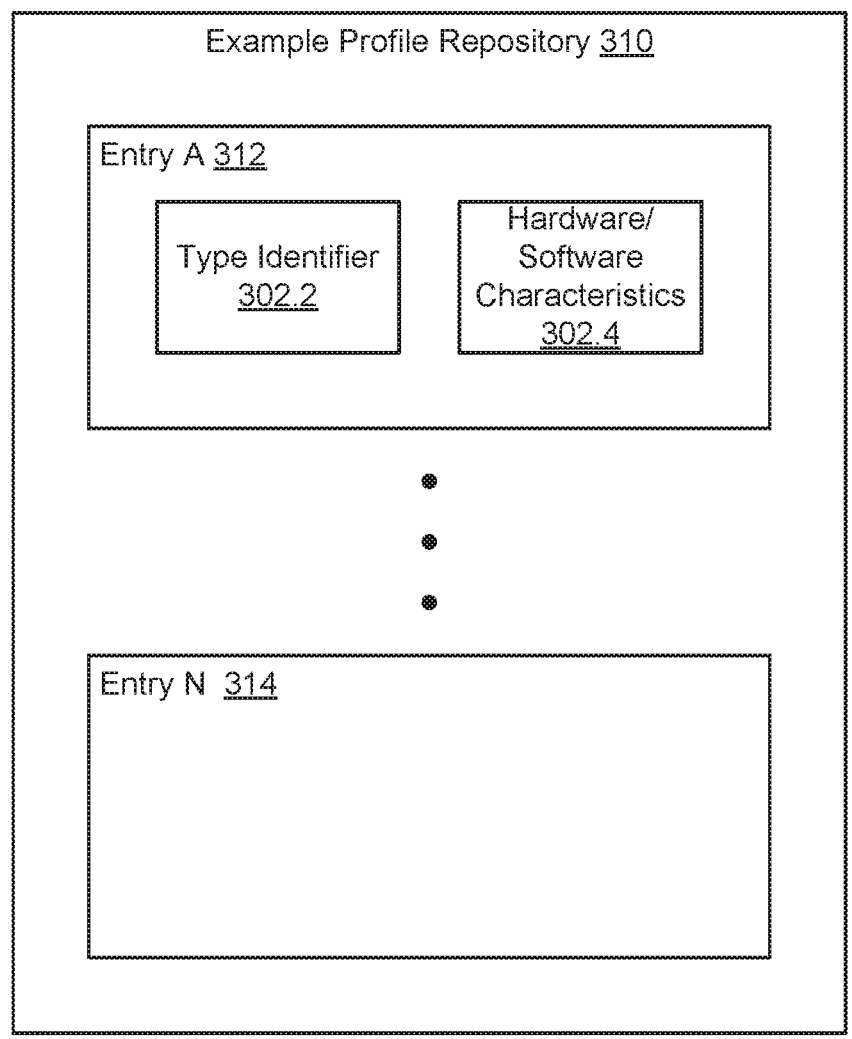
FIG. 3.2

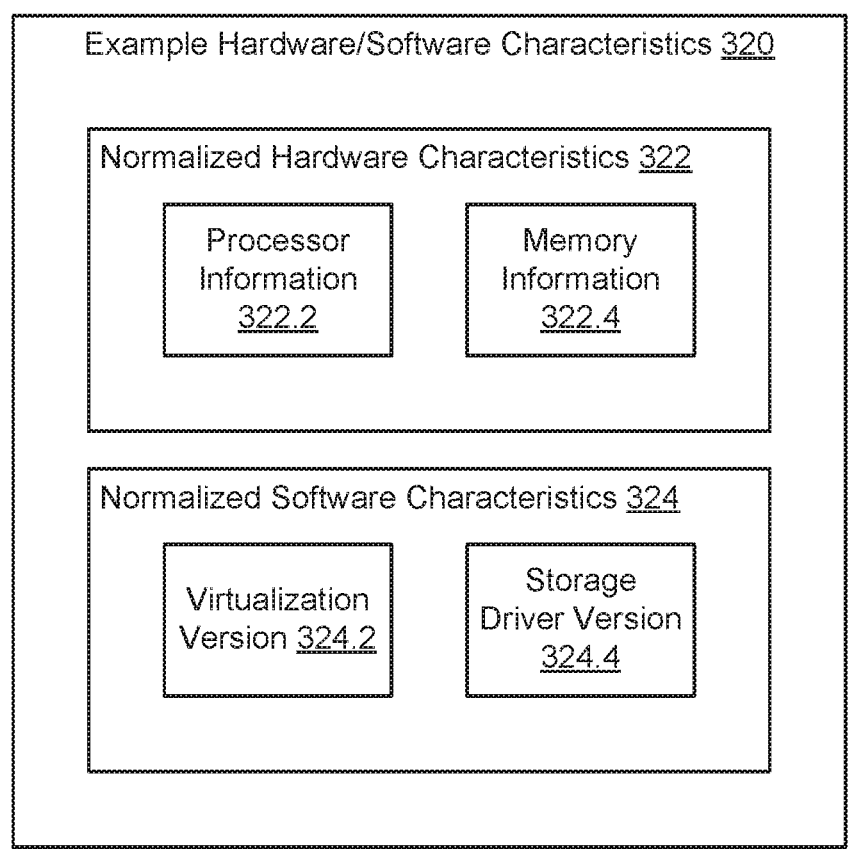
FIG. 3.3

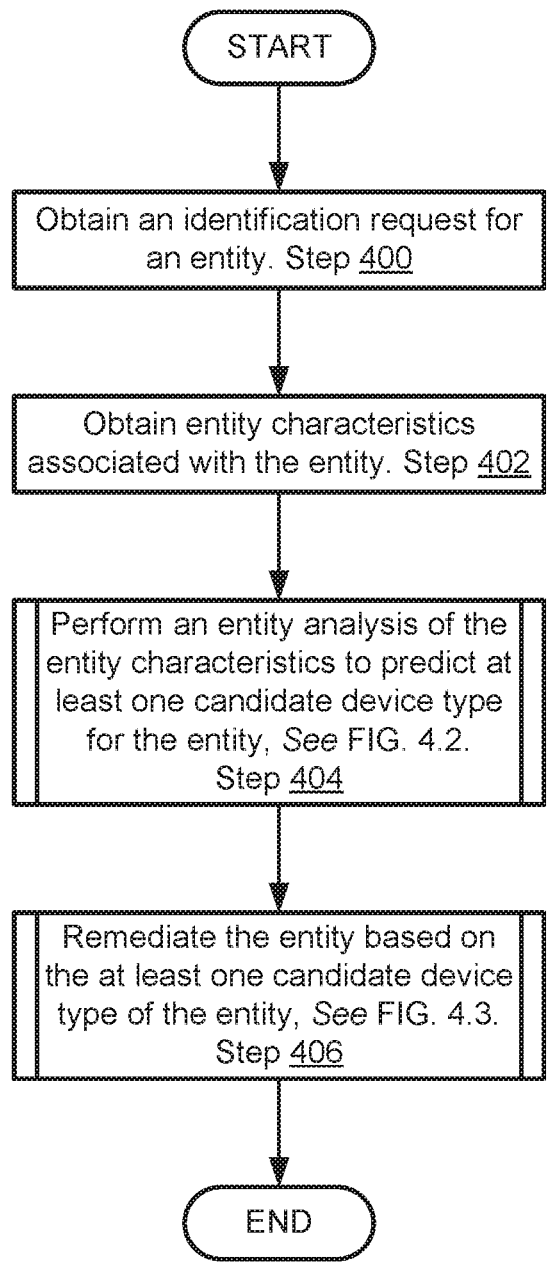
FIG. 4.1

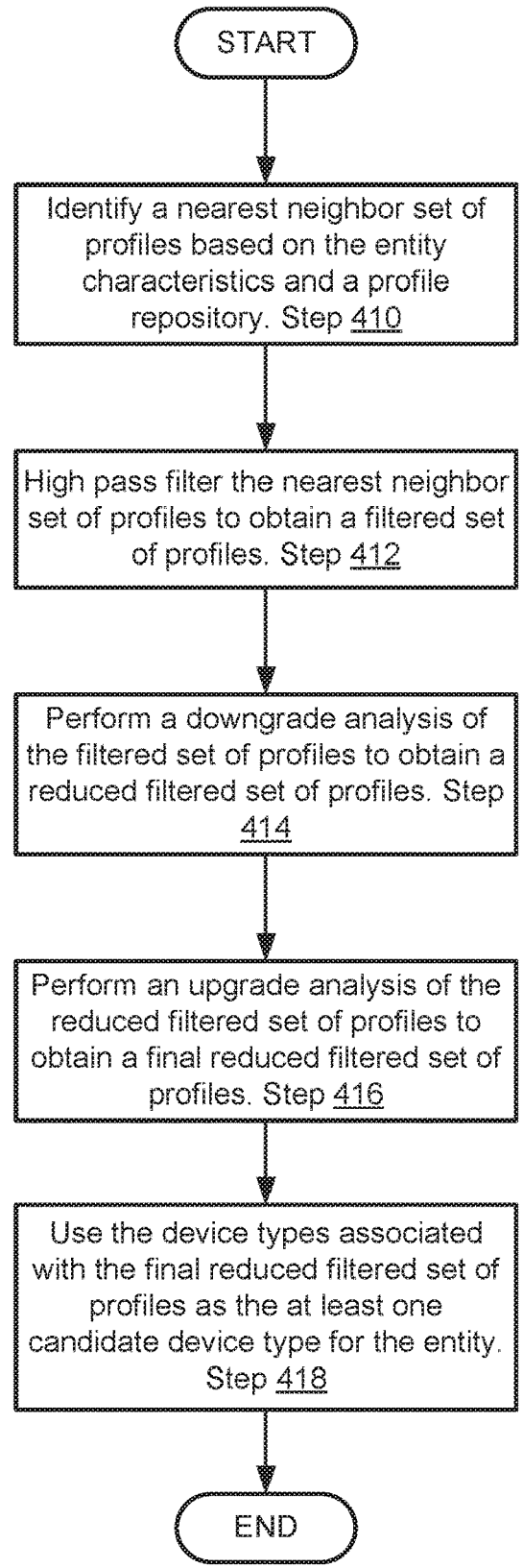
FIG. 4.2

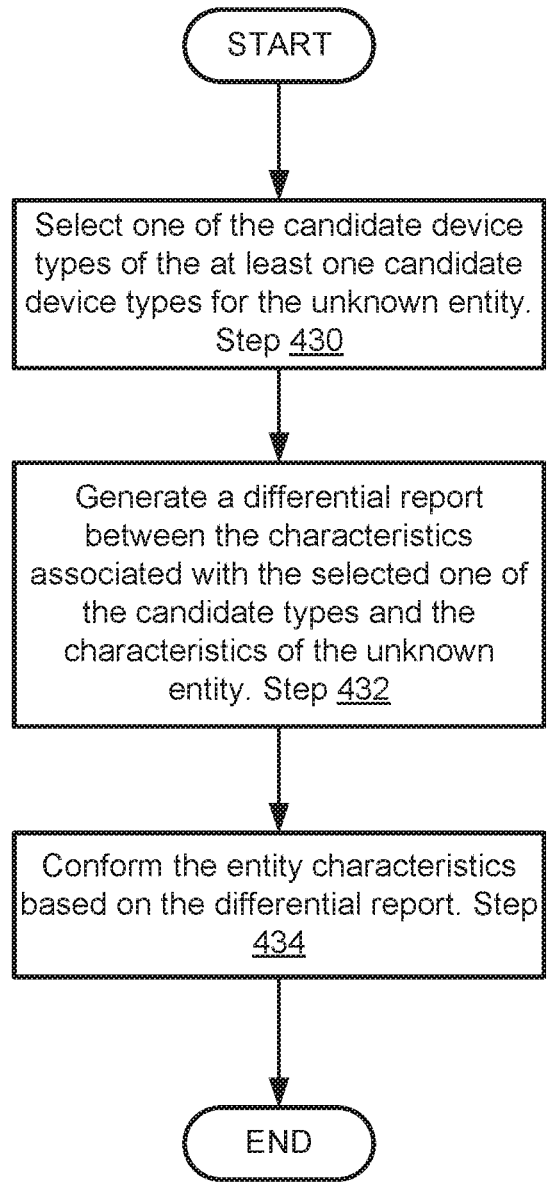
FIG. 4.3

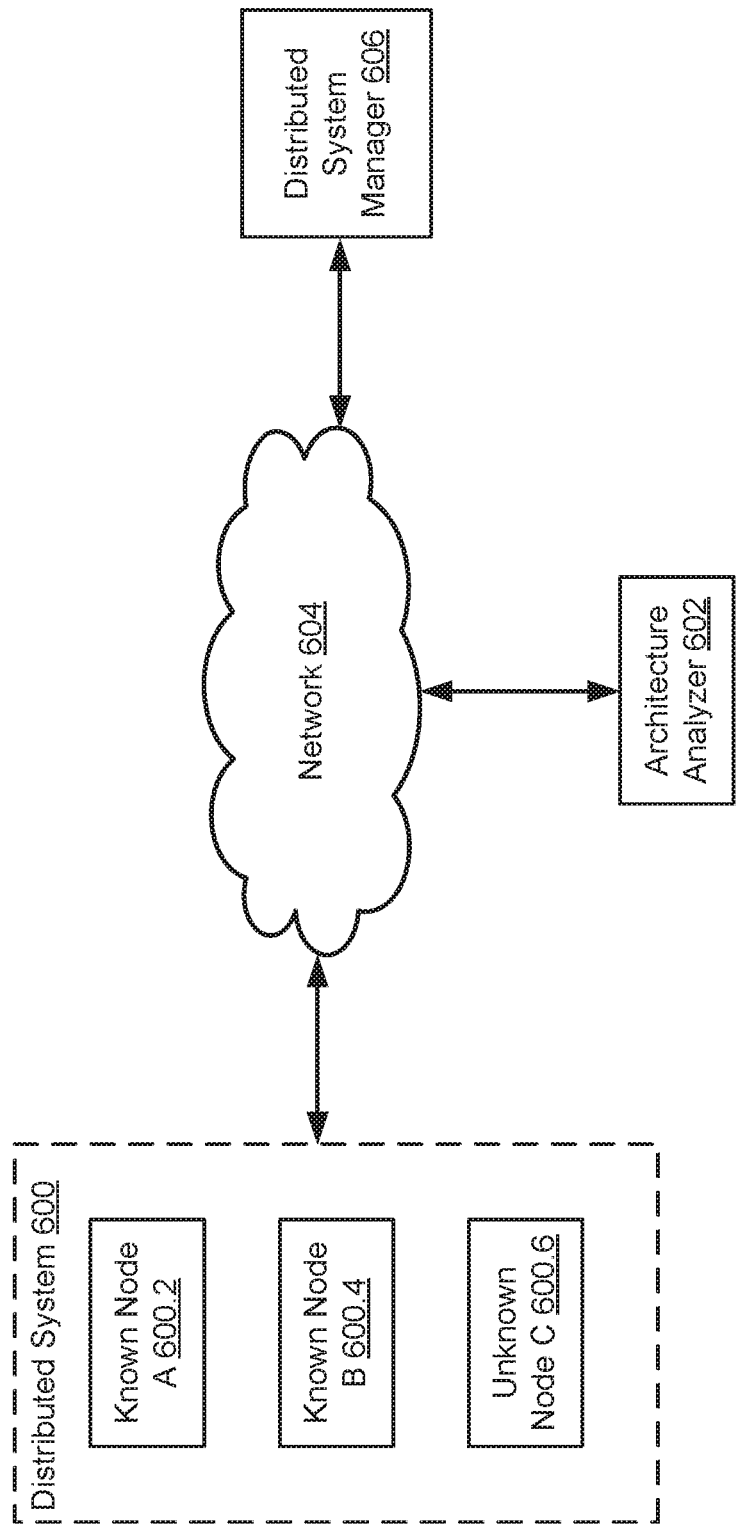
FIG. 6.1

| Unknown Node | Memory Capacity | CPU speed | OS Type | OS Version |
|---|---|---|---|---|
| | 768 GB | 3.2 GHz | Windows | 10.2 |

FIG. 6.2

| | Memory Capacity | CPU speed | OS Type | OS Version |
|---|---|---|---|---|
| Unknown Node | 768 GB | 3.2 GHz | Windows | 10.2 |
| Profile A | 768 GB | 3.2 GHz | Windows | 10.3 |
| Profile B | 1024 GB | 3.2 GHz | Windows | 10.2 |
| Profile C | 768 GB | 3.2 GHz | Windows | 10.1 |

| | | | | | Total |
|---|---|---|---|---|---|
| Diff A | 0 | 0 | 0 | 1 | 1 |
| Diff B | 1 | 0 | 0 | 0 | 1 |
| Diff C | 0 | 0 | 0 | 1 | 1 |

FIG. 6.3

|  | Memory Capacity | CPU speed | OS Type | OS Version |
|---|---|---|---|---|
| Unknown Node | 768 GB | 3.2 GHz | Windows | 10.2 |
| Profile A | 768 GB | 3.2 GHz | Windows | 10.3 |
| ~~Profile B~~ | ~~1024 GB~~ | ~~3.2 GHz~~ | ~~Windows~~ | ~~10.2~~ |
| Profile C | 768 GB | 3.2 GHz | Windows | 10.1 |

|  | | | | | Total |
|---|---|---|---|---|---|
| Diff A | 0 | 0 | 0 | 1 | 1 |
| ~~Diff B~~ | ∞ | 0 | 0 | 0 | ∞ |
| Diff C | 0 | 0 | 0 | 1 | 1 |

FIG. 6.4

| Unknown Node | Memory Capacity | CPU speed | OS Type | OS Version | Total |
|---|---|---|---|---|---|
| Profile A | 768 GB | 3.2 GHz | Windows | 10.2 | |
| ~~Profile C~~ | ~~768 GB~~ | ~~3.2 GHz~~ | ~~Windows~~ | ~~10.1~~ | |
| Diff A | 0 | 0 | 0 | 0 | 0 |
| ~~Diff C~~ | ~~0~~ | ~~0~~ | ~~0~~ | ~~1~~ | ~~1~~ |

FIG. 6.5

| Unknown Node | Memory Capacity | CPU speed | OS Type | OS Version | Total |
|---|---|---|---|---|---|
| | 768 GB | 3.2 GHz | Windows | 10.2 | |
| Profile A | 768 GB | 3.2 GHz | Windows | 10.3 | |
| Diff A | 0 | 0 | 0 | 1 | 1 |

FIG. 6.6

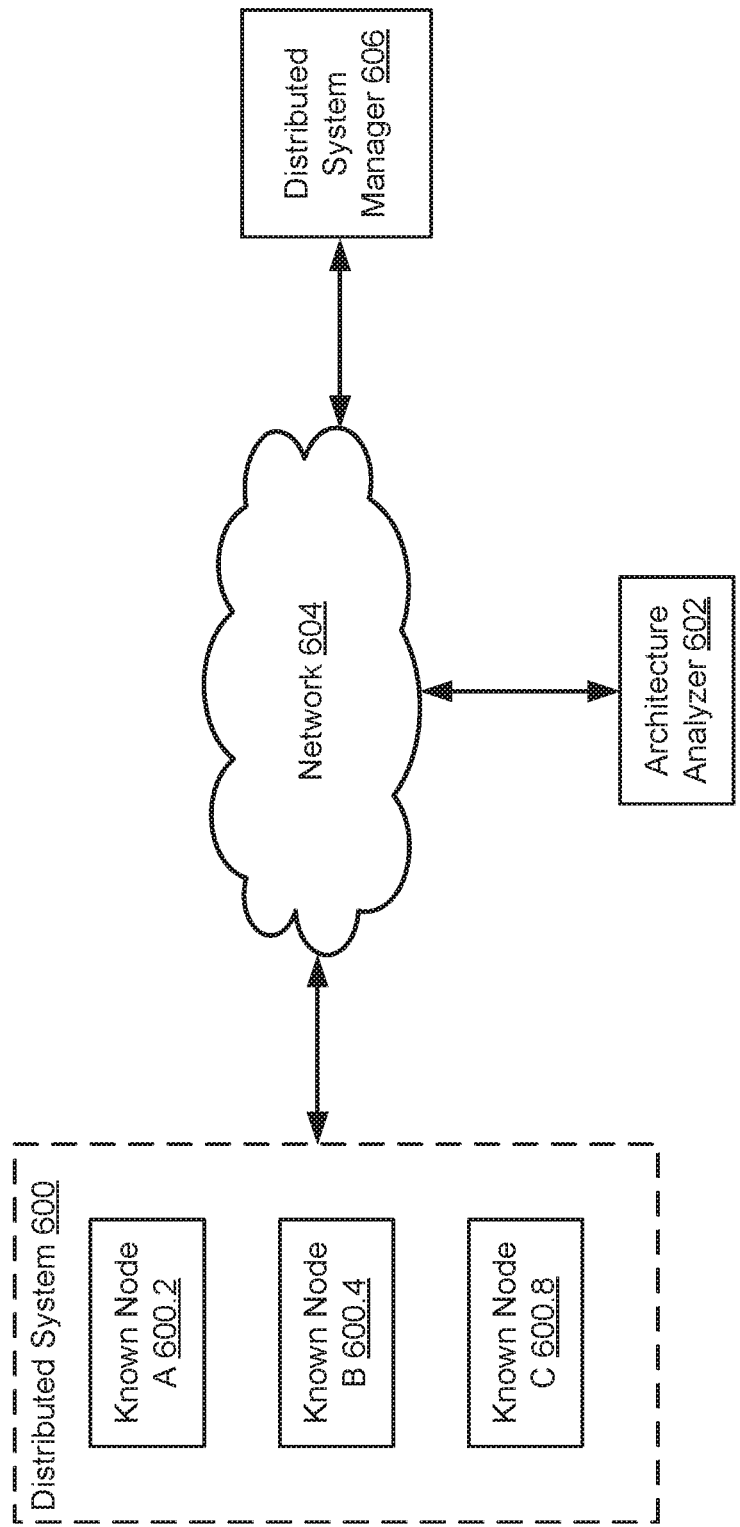
FIG. 6.7

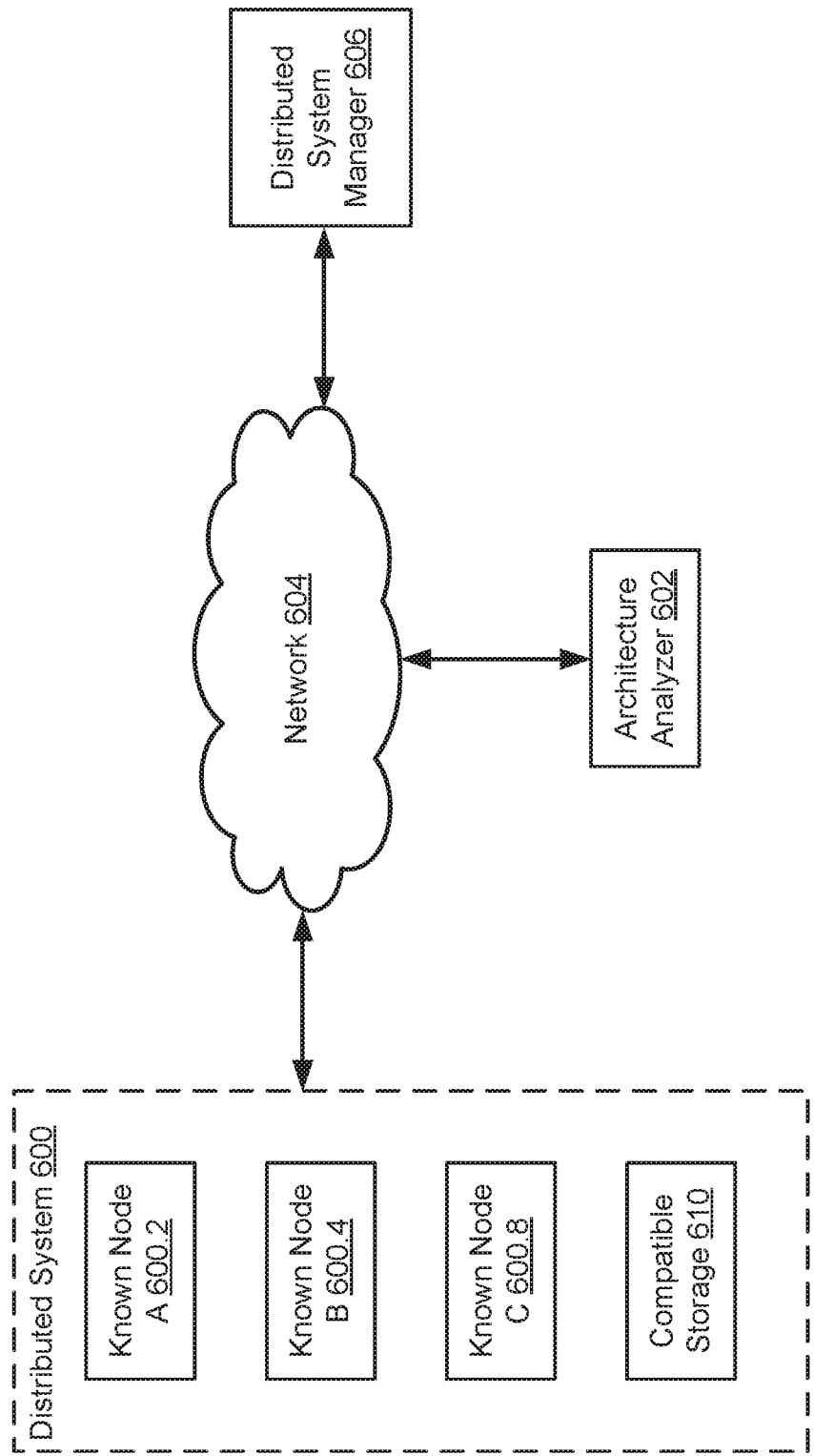
FIG. 6.8

SYSTEM AND METHOD FOR MANAGEMENT OF DISTRIBUTED SYSTEMS

BACKGROUND

Computing devices may interact via a network. For example, data may be sent between computing devices via the network. Such interactions may give rise to cooperative behavior between the computing devices. Different types of computing devices may perform different functions as part of a distributed system.

The configuration of computing devices may change over time. For example, software executing on a computing device may be upgraded or hardware components of a computing device may be changed. As the configuration of computing devices change it overtime it may be difficult to identify whether the computing devices are of a particular type which is to perform a particular function of a distributed system.

SUMMARY

In one aspect, an architecture analyzer for managing a distributed system in accordance with one or more embodiments of the invention includes persistent storage and an entity identifier. The persistent storage stores a profile repository. The entity identifier obtains entity characteristics associated with an entity; performs an entity analysis of the entity characteristics using the profile repository to predict at least one candidate device type for the entity; and remediates the entity based on the at least one candidate device type for the entity.

In one aspect, a method for managing a distributed system in accordance with one or more embodiments of the invention includes obtaining entity characteristics associated with an entity of the distributed system; performing an entity analysis of the entity characteristics using a profile repository to predict at least one candidate device type for the entity; and remediating the entity based on the at least one candidate device type for the entity.

In one aspect, a non-transitory computer readable medium in accordance with one or more embodiments of the invention includes computer readable program code, which when executed by a computer processor enables the computer processor to perform a method for managing a distributed system. The method includes obtaining entity characteristics associated with an entity of the distributed system; performing an entity analysis of the entity characteristics using a profile repository to predict at least one candidate device type for the entity; and remediating the entity based on the at least one candidate device type for the entity.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3.1 shows a diagram of an example of an entity characteristics repository in accordance with one or more embodiments of the invention.

FIG. 3.2 shows a diagram of an example of a profile repository in accordance with one or more embodiments of the invention.

FIG. 3.3 shows a diagram of an example of hardware/software characteristics in accordance with one or more embodiments of the invention FIG. 4.1 shows a flowchart of a method of remediating an entity in accordance with one or more embodiments of the invention.

FIG. 4.2 shows a flowchart of a method of performing an entity analysis in accordance with one or more embodiments of the invention.

FIG. 4.3 shows a flowchart of a method of remediating an entity based on candidate device types in accordance with one or more embodiments of the invention.

FIG. 6.1 shows a diagram of an example system.

FIG. 6.2 shows a diagram of characteristics of an unknown node of the system of FIG. 6.1.

FIG. 6.3 shows a diagram of the first phase of identifying the unknown node of the system of FIG. 6.1.

FIG. 6.4 shows a diagram of the second phase of identifying the unknown node of the system of FIG. 6.1.

FIG. 6.5 shows a diagram of the third phase of identifying the unknown node of the system of FIG. 6.1.

FIG. 6.6 shows a diagram of the fourth phase of identifying the unknown node of the system of FIG. 6.1.

FIG. 6.7 shows a diagram of the system of FIG. 6.1 after the unknown node is identified.

FIG. 6.8 shows a diagram of the system of FIG. 6.1 after adding additional storage.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing systems. The system in accordance with one or more embodiments of the invention include an architecture analyzer that determines the identity of unknown entities.

The architecture analyzer may computationally efficiently identify unknown entities. To do so, the architecture analyzer may implement a multiphase matching process that minimizes the difference function while also avoiding local minimums that may otherwise prevent accurate determination of identity of an unknown entity.

In one or more embodiments of the invention, the architecture analyzer performs multiphase matching process in a manner that reduces the candidate devices based on characteristics of the candidate devices. In other words, the differences between an unknown entity and candidate devices may be selectively used to reduce the candidate set during each phase of the matching process.

In one or more embodiments of the invention, architecture analyzer avoids problematic local minimums by treating certain characteristics of profiles and characteristics of unknown entities as being of extreme importance. For example, differences between unknown entities and known entities that are difficult to conform are treated as being infinitely different. By doing so, highly unlikely candidate devices may be eliminated while leaving more likely candidate devices in the candidate device set.

Figure 1:
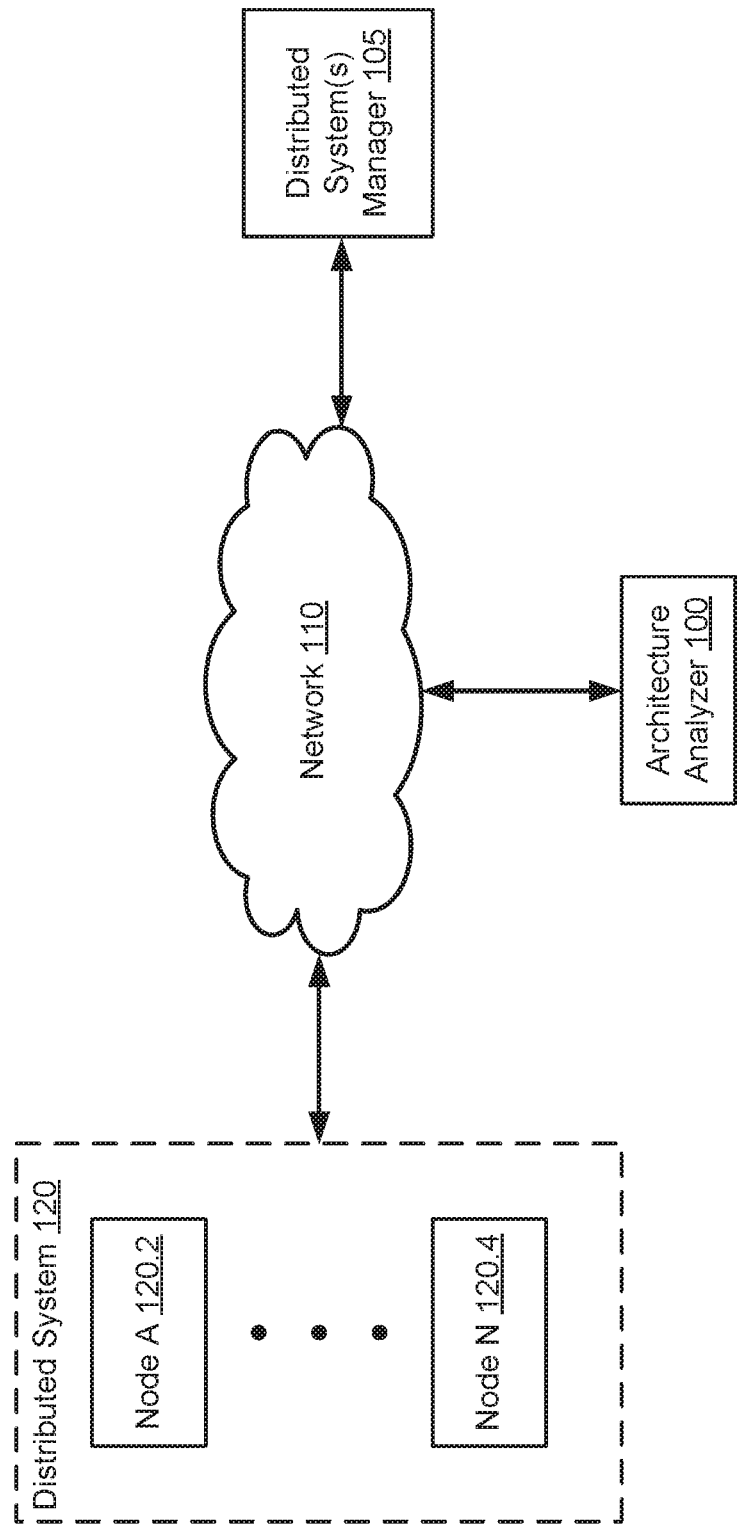
FIG. 1 shows a diagram of a system in accordance with one or more embodiments of the invention

FIG. 1 shows an example system in accordance with one or more embodiments of the invention. The example system may include an architecture analyzer (100). The architecture analyzer (100) determine an identity, e.g., a device type, of any number of devices. By doing so, the identities of unknown devices may be determined. Such identities may be used to manage the devices and/or distributed systems including the devices.

The example system may include a distributed system (120). The distributed system may include any number of nodes (e.g., node A (120.2), node N (120.4)). The nodes of the distributed system (120) may be computing devices. The nodes of the computing devices may perform similar or different functions of the distributed system (120).

The example system may further include a distributed system manager (105). The distributed system manager (105) may manage the distributed system (120). For example, the distributed system manager (105) may manage the state of the nodes of the distributed system to ensure that the distributed system (120) is capable providing predetermined functionality. Additionally, the distributed system manager (105) include configuration information for the distributed system (120). For example, the distributed system manager (105) may include a repository of hardware and/or software characteristics of nodes of the distributed system (120). Such information may be utilized to determine whether the nodes of the distributed system (120) are in states that enable them to contribute to the functionality of the distributed system (120).

Each of the aforementioned components of the example system may be operably connected to each other and/or other entities via a network (110). The network (110) may facilitate communications between each of these components of the example system. The network (110) include any number of wired and/or wireless networks. For example, the distributed system (120) may be connected to a local area network that is operably connected to a second local area network via the Internet. The architecture analyzer (100) may be part of the second local area network. Each component of the system illustrated in FIG. 1 is discussed below.

The architecture analyzer (100) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4.1-5. The architecture analyzer (100) may be other types of computing devices without departing from the invention. For additional details regarding a computing device, refer to FIG. 7.

The architecture analyzer (100) may be a logical device without departing from the invention. For example, the architecture analyzer (100) may be a virtual machine that utilizes computing resources of any number of physical computing devices to provide the functionality of the architecture analyzer (100). In one or more embodiments of the invention, the architecture analyzer (100) is implemented as an application hosted by a virtual machine that is hosted by a computing device (see, e.g., FIG. 7) such as a server or a cloud computing architecture. Thus, the architecture analyzer (100) may be a specially programmed computing device.

In one or more embodiments of the invention, the architecture analyzer (100) provides identification services. The architecture analyzer (100) may provide identification services by obtaining entity characteristics from an entity, performing an entity analysis of the entity characteristics using profiles of candidate devices to predict at least one candidate device types, and select one of the at least one candidate device types as an identity of the entity. The identity of the entity may be used by the architecture analyzer to remediate the entity. By doing so, the distributed system (120) may be managed by improving the likelihood that nodes of the distributed system (120) are in predetermined states that allow the distributed system (120) to provide its predetermined functionality. For additional details regarding architecture analyzers, refer to FIG. 2.

The distributed system (120) may provide computer implemented services to any number of entities (not shown). The computer implemented services may be of any and/or multiple types without departing from the invention. To provide computer implemented services, the distributed system (120) may include any number of nodes (e.g., 120.2, 120.4). The nodes may be programmed to perform predetermined functionality. The predetermined functionality of each of the nodes may give rise to the functionality, i.e., computer implemented services, of the distributed system (120).

In one or more embodiments of the invention, the identity of at least one of the nodes of the distributed system (120) is unknown. The identity of a node may be a device type. For example, when a distributed system is initially deployed it may include any number of devices. Different types of devices may include different types of hardware and/or software components. To manage the distributed system (120), it may be important to identify the device types of each of the nodes of the distributed system (120). Such information may be used by the distributed system manager (105) and/or other entities for management purposes of the distributed system (120), For example, consider a scenario in which a distributed system is running out of storage space. To continue operation of the distributed system it may be necessary to add storage space to the distributed system. To make such an addition to the distributed system, it may be required to know the hardware components of each of the nodes of the distributed system for compatibility purposes when selecting components to provide storage space. If the identities of the nodes are not known, it may be impossible to provide the storage space while ensuring compatibility with existing hardware and/or software components of the distributed system (120). To address this and/or other issues, embodiments of the invention may provide a method for identifying devices within a distributed system and/or in isolation.

Each of the nodes (e.g., 120.2, 120.4) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, computer code, that when executed by the processor(s) of the computing device cause the computing device to perform the functions described in this application. The nodes (e.g., 120.2, 120.4) may be other types of computing devices without departing from the invention. For additional details regarding a computing device, refer to FIG. 7.

The distributed system manager (105) may be a computing device. The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and/or all, or portion, of the methods illustrated in FIGS. 4.1-5. The distributed system manager (105) may be other types of computing devices without departing from the invention. For additional details regarding a computing device, refer to FIG. 7.

The distributed system manager (105) may be a logical device without departing from the invention. For example, the distributed system manager (105) may be a virtual machine that utilizes computing resources of any number of physical computing devices to provide the functionality of the distributed system manager (105). In one or more embodiments of the invention, the distributed system manager (105) is implemented as an application hosted by a virtual machine that is hosted by a computing device (see, e.g., FIG. 7) such as a server or a cloud computing architecture. Thus, the distributed system manager (105) may be a specially programmed computing device.

In one or more embodiments of the invention, the distributed system manager (105) provides management services to the distributed system (120). To provide management services to the distributed system (120), the distributed system manager (105) may maintain a repository of the hardware and/or software characteristics of devices that may be components of the distributed system (120) and/or other distributed systems. For example, the distributed system manager (105) include a repository of the hardware and/or software characteristics of all possible devices that may be components of the distributed system (120). The distributed system manager (105) may provide information from the repository to other entities such as the architecture analyzer (100). By doing so, other entities may be notified of hardware and/or software characteristics of potential components of the distributed system (120).

Additionally, the distributed system manager (105) may add and/or remove components from the distributed system (120) to manage the distributed system (120). By doing so, the distributed system manager (105) may add and/or remove computing resources from the distributed system manager (105) to ensure that the distributed system (120) is capable of performing its predetermined functionality.

While the system of FIG. 1 has been described and illustrated as including a limited number of components for the sake of brevity, a system in accordance with embodiments of the invention may include additional, fewer, and/or different components than those illustrated in FIG. 1 without departing from the invention.

Figure 2:
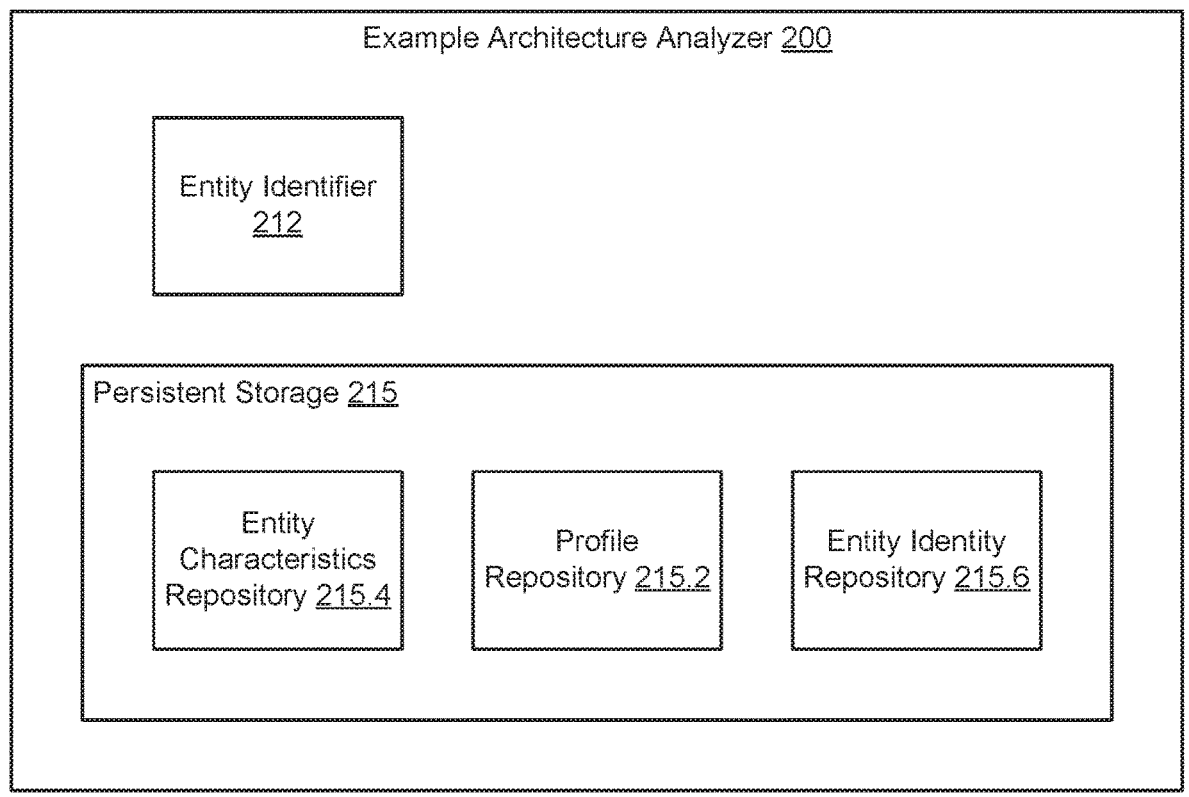
FIG. 2 shows a diagram of an example architecture analyzer in accordance with one or more embodiments of the invention.

As discussed above, an architecture analyzer (100) may facilitate management of distributed systems by determining the identities of one or more entities that are components of the distributed systems. FIG. 2 shows a diagram of an example architecture analyzer (200) in accordance with one or more embodiments of the invention. The example architecture analyzer (200) may be similar to the architecture analyzer (100, FIG. 1) of FIG. 1.

As discussed above, the example architecture analyzer (200) may provide identification services to facilitate management of distributed systems. To do so, the example architecture analyzer (200) may perform a computationally efficient process for device identification. To provide the aforementioned functionality of the example architecture analyzer (200), the example architecture analyzer (200) may include an entity identifier (212) and a persistent storage (215). Each component of the example architecture analyzer (200) is discussed below.

In one or more embodiments of the invention, the entity identifier (212) is a hardware device including circuitry. The entity identifier (212) may be, for example, a digital signal processor, a field programmable gate array, or an application specific integrated circuit. The entity identifier (212) may be other types of hardware devices without departing from the invention.

In one or more embodiments of the invention, the entity identifier (212) is implemented as computing code stored on a persistent storage that when executed by a processor performs the functionality of the entity identifier (212). The processor may be a hardware processor including circuitry such as, for example, a central processing unit or a microcontroller. The processor may be other types of hardware devices for processing digital information without departing from the invention.

The entity identifier (212) may provide identification services. Identification services may include determining an identity of an entity of the distributed system or other type of computational system. The entity identifier (212) may provide identification services by matching characteristics of an unknown entity to profiles associated with known entities. However, due to the large number of potential known entities, the process of matching the characteristics of unknown entity to the profiles associated with the known entities may be computationally complex.

For example, consider a scenario in which characteristics of an unknown entity are matched to profiles of a profile repository. Because of the large number of potential configurations of any particular device, there may be tens of thousands of profiles the profile repository. Additionally, due to drift of the unknown entity from its original state, the characteristics of the unknown entity may not perfectly match any of the profiles included in the repository. Thus, the process of performing a match may be extremely costly from a computational standpoint.

An example architecture analyzer (200) in accordance with one or more embodiments of the invention may provide a computationally efficient method for matching an unknown entity to a known entity based on the characteristics of the unknown entity and profiles of known entities. The computationally efficient process may be performed by the entity identifier (212) and may include (i) obtaining characteristics of the unknown entity, (ii) generating a normalized profile repository based on characteristics of the known entities, and (iii) performing a four-step minimization process. The four-step minimization process may include (a) calculating a difference between characteristics of the unknown entity and each of the known entities to identify a first subset of the known entities, (b) high-pass filtering the first subset of the known entities to identify a second subset of the known entities, (c) performing a downgrade analysis of the second subset of the known entities to identify a third subset of the known entities, and (d) performing an upgrade analysis of the third subset of the known entities to identify a fourth subset of the known entities. The known entity of the fourth subset of the known entities having a lowest distance from the unknown entity may be selected as the type of the unknown entity (i.e., as matching the unknown entity).

The persistent storage (215) may be a storage for storing data. The persistent storage (215) may be a physical or logical storage. For example, the persistent storage (215) may include hard disk drives, solid state drives, and/or tape drives for storing data. The persistent storage (215) may include other types of non-transitory storage mediums without departing from the invention.

In another example, the persistent storage (215) may be logical storage such as a virtual disk. The virtual disk may utilize storage resources of any number of persistent storage mediums such as, for example, hard disk drives, solid state drives, and/or tape drives to provide storage resources.

In one or more embodiments of the invention, the persistent storage (215) stores data utilized by the entity identifier (212) when the entity identifier (212) provides identification services. The persistent storage (215) may store data structures including, but not limited to, an entity characteristics repository (215.4), a profile repository (215.2), and/or an entity identity repository (215.6). Each of these data structures is discussed below.

The entity characteristics repository (215.4) may be a data structure that stores information, e.g., characteristics, regarding an unknown entity. For example, when the entity identifier (212) is tasked with determining an identity of an unknown entity, characteristics regarding the unknown entity may be stored in the entity characteristics repository (215.4). Such characteristics may include, for example, types of hardware included in the unknown entity and/or types of software hosted by the unknown entity.

While the entity characteristics repository (215.4) has been illustrated as being stored in persistent storage, the entity characteristics repository (215.4) to be stored in memory rather than persistent storage without departing from the invention. For additional details regarding the entity characteristics repository (215.4), refer to FIG. 3.1

The profile repository (215.2) may be a data structure that stores any number of profiles associated with any number of known entities. The profiles may be derived from characteristics of the known entities. The entity identifier (212) may match characteristics of the unknown entity stored in the entity characteristics repository (215.4) to the profiles included in the profile repository (215.2) when the entity identifier (212) provides identification services. For additional information regarding the profile repository (215.2), refer to FIG. 3.2.

The entity identity repository (215.6) may be a data structure storing the identities of unknown entities that have been previously identified. For example, when an unknown entity is matched to a profile and the profile repository (215.2), the unknown entity may be determined to be the known entity associated with the profile to which the unknown entity is matched. That match may be recorded in the entity identity repository (215.6) to create a record of the identities of previously unknown entities.

While the data structures of the persistent storage (215) have been illustrated as separate data structures, the information included in each of these data structures may be combined into a single data structure, divided into any number of data structures, and/or may be stored in locations other than the persistent storage (215) of the example architecture analyzer (200) without departing from the invention. Additionally, each of these data structures may include additional, less, and/or different information than previously discussed above without departing from the invention.

To further clarify embodiments of the invention, diagrams of data structures that may be utilized by the system of FIG. 1 are shown in FIGS. 3.1-3.3.

FIG. 3.1 shows a diagram of an example entity characteristics repository (300) in accordance with one or more embodiments of the invention. The example entity characteristics repository (300) may be a data structure for storing characteristics of an unknown entity.

In one or more embodiments of the invention, the example entity characteristics repository (300) includes test hardware characteristics (302). The test hardware characteristics (302) may include information regarding hardware components of the unknown entity. For example, the test hardware characteristics (302) may include processor information (302.2) and memory information (302.4). This information may specify an identifier of the aforementioned hardware elements and other characteristics about the hardware elements such as data processing rates, data storage capacities, input output (IO) rates, or any other type of characteristic of the hardware element.

While the test hardware characteristics (302) have been described by way of example as including information regarding processors and memory, the test hardware characteristics (302) include information regarding different types of hardware elements such as, for example, communication hardware, storage controller hardware, interconnect hardware, or any other type of hardware without departing from the invention.

The example entity characteristics repository (300) may also include test software characteristics (304). The test software characteristics (304) include information regarding any software components, e.g., applications, firmware, etc., hosted by the unknown entity. For example, the test software characteristics (304) may specify a virtualization version (304.2) of an environment emulator hosted by the unknown entity. In another example, the test software characteristics (304) may specify a storage driver version (304.4).

While the test software characteristics (304) have been described by way of example as including information regarding processors and memory, the test software characteristics (304) include information regarding different types of software such as, for example, identities of management software, a BIOS version, or information regarding any other types of software hosted by the unknown entity without departing from the invention.

As will be discussed in greater detail below, the example entity characteristics repository (300) may be populated using characteristics obtained from an unknown entity, or other source of information regarding the unknown entity.

FIG. 3.2 shows a diagram of an example profile repository (310) in accordance with one or more embodiments of the invention. The example profile repository (310) may be a data structure for storing profiles of known entities. Each profile may be a data structure that includes normalized characteristics of a known entity. Normalized characteristics of a known entity may be obtained by filtering the characteristics of the known entity to create a uniform data structure that is comparable to other profiles and/or characteristics obtained from an unknown entity. By normalizing the characteristics of the known entities, a comparison domain may be generated to efficiently match unknown entities to known entities and thereby identify the unknown entities.

In one or more embodiments of the invention, the example profile repository (310) includes a list of any number of entries (e.g., 312, 314). Each of the entries may be associated with a corresponding profile that is, in turn, associated with a corresponding known entity.

Each entry may include a type identifier (302.2). The type identifier (302.2) may associate the entry with a known device. Thus, when an unknown entity is matched to a particular profile, the unknown entity may be determined to be the known entity, i.e., the same type of device, associated with the type identifier (302.2).

Each entry may also include hardware/software characteristics (302.4). The hardware/software characteristics (302.4) may be derived from characteristics of a known entity associated with the type identifier (302.2) of the entry that includes the hardware/software characteristics (302.4).

In one or more embodiments of the invention, the hardware/software characteristics (302.4) are normalized based on a template (not shown). The template may define the characteristics of the known entity that are included in the hardware/software characteristics (302.4). Thus, the template may filter characteristics of the known entity to obtain a limited set of the characteristics of the known entity. By doing so, the comparison domain may be standardized to a set of characteristics for each known entity. For additional details regarding the hardware/software characteristics (302.4), refer to FIG. 3.3.

The hardware/software characteristics (302.4) of each entry may be obtained by generating them based on the characteristics of each known entity or may be obtained from a repository hosted by another entity (e.g., a distributed systems manager, FIG. 1). In other words, the hardware/software characteristics (302.4) for each known entity may be maintained in a centralized source in some embodiments of the invention while the hardware/software characteristics (302.4) are obtained by generation in other embodiments of the invention.

FIG. 3.3 shows a diagram of example hardware/software characteristics (320) in accordance with one or more embodiments of the invention. As noted above, the example hardware/software characteristics (320) may include a normalized set of characteristics of a known entity.

In one or more embodiments of the invention, the example hardware/software characteristics (320) includes normalized hardware characteristics (322) and normalized software characteristics (324). The normalized hardware characteristics (322) may include information regarding hardware components of a known entity. For example, the normalized hardware characteristics (322) may include processor information (322.2) and memory information (322.4). The normalized hardware characteristics (322) may include any quantity and/or type of information regarding any number and/or type of hardware components of a known entity without departing from the invention.

For example, normalized hardware characteristics (322) may specify a type, processing rate, power consumption rate, and latency of the processor hosted by a known entity. In another example, the normalized hardware characteristics (322) may specify a communication bandwidth and poor quantity of the network processor hosted by a known entity. In still further example, the normalized hardware characteristics (322) may specify the quantity and bandwidth of memory hosted by a known entity.

The normalized software characteristics (324) include information regarding software components of a known entity. For example, the normalized software characteristics (324) may specify a virtualization version (324.2) of emulation software hosted by a known entity and the storage driver version (324.4) hosted by the known entity. The normalized software characteristics (324) may include any quantity and/or type of information regarding any number and/or type of software components of a known entity without departing from the invention.

For example, the normalized software characteristics (324) may specify the type and version number of an operating system hosted by the known entity. In another example, the normalized software characteristics (324) may specify the type and version number of the storage controller hosted by the known entity. In a still further example, the normalized software characteristics (324) may specify the type and version number of the graphics card driver hosted by the known entity.

While the data structures illustrated in FIGS. 3.1-3.3 have been illustrated as including a limited quantity of information, these data structures include additional, less, and/or different information without departing from the invention. Further, the structure of the information included in these data structures may be different than as illustrated in FIGS. 3.1-3.3 without departing from the invention.

Returning to FIG. 1, the system may facilitate management of distributed systems by identifying unknown entities of the distributed systems. FIGS. 4.1-5 illustrate methods that may be performed by components of the system of FIG. 1 to provide such functionality. While the methods illustrated in FIGS. 4.1-5 are illustrated as a series of steps, the steps may be performed in a different order, some of the steps may be omitted, and/or any number of the steps may be performed in a parallel and/or partially overlapping manner without departing from the invention.

FIG. 4.1 shows a flowchart of a method in accordance with one or more embodiments of the invention. The method depicted in FIG. 4.1 may be used to identify an entity in accordance with one or more embodiments of the invention. The method shown in FIG. 4.1 may be performed by, for example, an architect analyzer (e.g., 100, FIG. 1). Other components of the system illustrated in FIG. 1 may perform all, or a portion, of the method of FIG. 4.1 without departing from the invention.

In step 400, an identification request for an entity is obtained.

In one or more embodiments of the invention, the identification request is obtained from a network communication. The network communication may be sent by any entity including, but not be limited to, a distributed system manager.

The identification request may specify the entity. For example, identification request may include information that allows for specification of the entity. The information may be an internet protocol address of the entity. The information may be other types of identifiers without departing from the invention.

In step 402, entity characteristics associated with the entity are obtained.

In one or more embodiments of the invention, the entity characteristics associated with the entity are obtained from a repository hosted by another entity. For example, the distributed system manager may host the repository. The entity characteristics may be obtained by requesting them from the distributed system manager.

In one or more embodiments of the invention, the entity characteristics associated with the entity are obtained from the entity. For example, a characteristics request may be sent to the entity which may respond by sending the characteristics to requesting entity.

In one or more embodiments of the invention, the entity characteristics associated with the entity are obtained from a life cycle controller hosted by the entity. For example, the lifecycle controller may be a computing device hosted by the entity. The lifecycle controller may interrogate the entity to determine its characteristics and send such characteristics to a requesting entity.

The entity characteristics may be obtained via other methods without departing from the invention.

In step 404, an entity analysis of the entity characteristics is performed to predict at least one candidate device type for the entity.

In one or more embodiments of the invention, the entity analysis matches the characteristics of the entity to a profile stored in a profile repository. The device type associated with the match profile as the identity of the entity.

In some scenarios, the result of the entity analysis may be a match of the entity to multiple profiles. In such a scenario, one of the match profiles may be selected for identification purposes. The selection may be via any method without departing from the invention. For example, the first match profile may be selected for identification purposes.

In one or more embodiments of the invention, the entity analysis is performed via the method illustrated in FIG. 4.2. The entity analysis may be performed via other methods without departing from invention.

In one or more embodiments of the invention, the entity analysis is a computationally efficient global minimization routine. The computationally efficient global minimization routine may include minimizing a difference function as the values of profiles are modulated during different phases of the computationally efficient global minimization routine. By doing so, less likely matches may be efficiently eliminated during each phase of the routine. Consequently, the resulting match at the end of routine is obtained in a computationally efficient manner and less likely to be a local minimum when compared to contemporary matching routines.

In step 406, the entity is remediated based on the at least one candidate device type of the entity.

In one or more embodiments of the invention, remediating the entity places the entity in a predetermined state. The predetermined state may be a state associated with the matched profile, e.g., the state of the device type associated with the profile. For example, the entity may be matched with a profile but the match is imperfect. Remediating the entity may eliminate such imperfections.

The method may end following step 406.

FIG. 4.2 shows a flowchart of a method in accordance with one or more embodiments of the invention. The method depicted in FIG. 4.2 may be used to perform an entity analysis in accordance with one or more embodiments of the invention. The method shown in FIG. 4.2 may be performed by, for example, an architect analyzer (e.g., 100, FIG. 1). Other components of the system illustrated in FIG. 1 may perform all, or a portion, of the method of FIG. 4.2 without departing from the invention.

In step 410, a nearest neighbor set of profiles are identified based on the entity characteristics of the unknown entity and profile repository including profiles of known entities.

In one or more embodiments of the invention, the nearest neighbor set of profiles is identified by calculating the difference between the characteristics of the unknown entity and each profile. All profiles having the same difference that is a global minimum are selected as the nearest neighbor set of profiles. In other words, multiple profiles may be included in the nearest neighbor set of profiles, all of the profiles in the nearest neighbor set of profiles have the same difference, and the difference may be the smallest when compared to the difference of other profiles not included in the nearest neighbor set of profiles.

In one or more embodiments of the invention, the difference between the characteristics of the unknown entity and the profile is calculated by determining whether each element of the characteristics is different from a corresponding element of the profile. Each determined difference may be treated as having a numerical value of 1. The determined differences may be summed to determine the difference between the characteristics of the unknown entity and the profile. For example, the difference may be calculated as:

$$\text{difference} = \sum_{i=1}^{n} d(p_i, q_i)$$

$$d(p_i, q_i) = \begin{cases} 0 : p_i = q_i \\ 1 : p_i \neq q_i \\ \infty : p_i \neq q_i \text{ and not } p_i \text{ not easily modifiable} \end{cases}$$

$p_i$ is the element of the profile $q_i$ is the element of the characteristics of the unknown entity For example, consider a scenario in which an unknown entity includes a 3 GHz processor and 1 GB of memory and the profile specifies a 2.8 GHz processor and 1 GB of memory. To calculate the difference between the unknown entity and the profile, the difference between the processors is considered as a numerical value of 1 and the difference between memories is considered as a numerical value of 0 because the memory is identical but the processors are different. Thus, the difference is a numerical value of 1+0=1.

In step 412, the nearest neighbor set of profiles is high-pass filtered to obtain a filtered set of profiles.

In one or more embodiments of the invention, high-pass filtering the nearest neighbor set of profiles eliminates all of the profiles having characteristics that are different from the characteristics of the unknown profile that may also not be easily modifiable. In one or more embodiments of the invention, the characteristic is not easily modifiable if it would require physical intervention such as, for example, replacement of a component.

In one or more embodiments of the invention, the nearest neighbor set of profiles is high-pass filtered by considering the numerical value of the difference between each element of the characteristics of the unknown entity and the corresponding element of each profile to be infinite if there is a difference and the element is not easily modifiable. The nearest neighbor set may then be determined and used as the filtered nearest neighbor set.

For example, consider the previous example of the unknown entity that includes the 3 GHz processor and 1 GB of memory and the profile that specifies the 2.8 GHz processor and the 1 GB of memory. When high-pass filtering, the difference in processors is considered to be not easily modifiable because doing so would require physical replacement of the 3 GHz processor with a 2.8 GHz processor. Consequently, the difference would be calculated as $\infty+0=\infty$. Thus, when the filtered nearest neighbor set is determined, the profile having the 2.8 GHz processor is eliminated because the difference between this profile and the characteristics of the unknown entity is not infinite.

In step 414, a downgrade analysis of the filtered set of profiles is performed to obtain a reduced filtered set of profiles.

In one or more embodiments of the invention, the downgrade analysis is performed by calculating a difference between each profile and the characteristics of the unknown entity that may be downgraded to improve the match with the characteristics of the unknown entity. For example, the difference may be calculated using the following equations:

$$\text{difference} = \sum_{i=1}^{n} d(p_i, q_i)$$

$$d(p_i, q_i) = \begin{cases} 0 : p_i = q_i \\ 0 : p_i \neq q_i \text{ if the element is not downgradable} \\ 1 : p_i \neq q_i \text{ if the element is downgradable} \end{cases}$$

$p_i$ is the element of the profile
$q_i$ is the element of the characteristics of the unknown entity The reduced filtered set of profiles may include all of the profiles that, after applying the above equation to each profile of the filtered set of profiles, has the smallest value. Multiple profiles may have the same, smallest value. Thus, the reduced filtered set of profiles may include multiple profiles.

In step 416, an upgrade analysis of the reduced filtered set of profiles is performed to obtain a final reduced filtered set of profiles.

In one or more embodiments of the invention, the upgrade analysis is performed by calculating a difference between each profile and the characteristics of the unknown entity that may be upgraded to improve the match with the characteristics of the unknown entity. For example, the difference may be calculated using the following equations:

$$\text{difference} = \sum_{i=1}^{n} d(p_i, q_i)$$

$$d(p_i, q_i) = \begin{cases} 0 : p_i = q_i \\ 0 : p_i \neq q_i \text{ if the element is not upgradable} \\ 1 : p_i \neq q_i \text{ if the element is upgradable} \end{cases}$$

$p_i$ is the element of the profile
$q_i$ is the element of the characteristics of the unknown entity The final reduced filtered set of profiles may include all of the profiles that, after applying the above equation to each profile of the reduced filtered set of profiles, has the smallest value. Multiple profiles may have the same, smallest value. Thus, the final reduced filtered set of profiles may include multiple profiles.

In step 418, the device types associated with the profiles of the final reduced filtered set of profiles are used as the at least one candidate device type for the entity.

The method may end following step 418.

FIG. 4.3 shows a flowchart of a method in accordance with one or more embodiments of the invention. The method depicted in FIG. 4.3 may be used to perform a remediation in accordance with one or more embodiments of the invention. The method shown in FIG. 4.3 may be performed by, for example, an architect analyzer (e.g., 100, FIG. 1). Other components of the system illustrated in FIG. 1 may perform all, or a portion, of the method of FIG. 4.3 without departing from the invention.

In step 430, one of the candidate device types of the at least one candidate device types is selected for the unknown entity. In other words, one of the candidate devices determined via the method illustrated in FIG. 4.2 is selected for the unknown entity and is used as the identity of the unknown entity.

In step 432 the differential report between the characteristics associated with the selected one of the candidate device types and the characteristics of the unknown entity is generated.

In one or more embodiments of the invention, the differential report specifies each of the differences between the unknown entity and the device type that is selected as identity of the unknown entity. For example, the selected device type may have a different version of an operating system from that of the unknown entity. The differential report may specify this difference.

In one or more embodiments of the invention, the differential report is provided to the entity that requested the identification of the unknown entity. For example, the differential report may be provided to a distributed system manager.

In step 434, the characteristics of the unknown entity are conformed based on the differential report. In other words, differences between the unknown entity and the device type that is selected as identity of the unknown entity are eliminated. The differences may be eliminated by, for example, modifying software hosted by the unknown entity. In another example, the differences may be eliminated by updating a driver version hosted by the unknown entity. In a still further example, differences may be eliminated by disabling one or more hardware components of the unknown entity. In yet a further example, the differences are eliminated by replacing a hardware component of the unknown entity.

The method may end following step 434.

Figure 5:
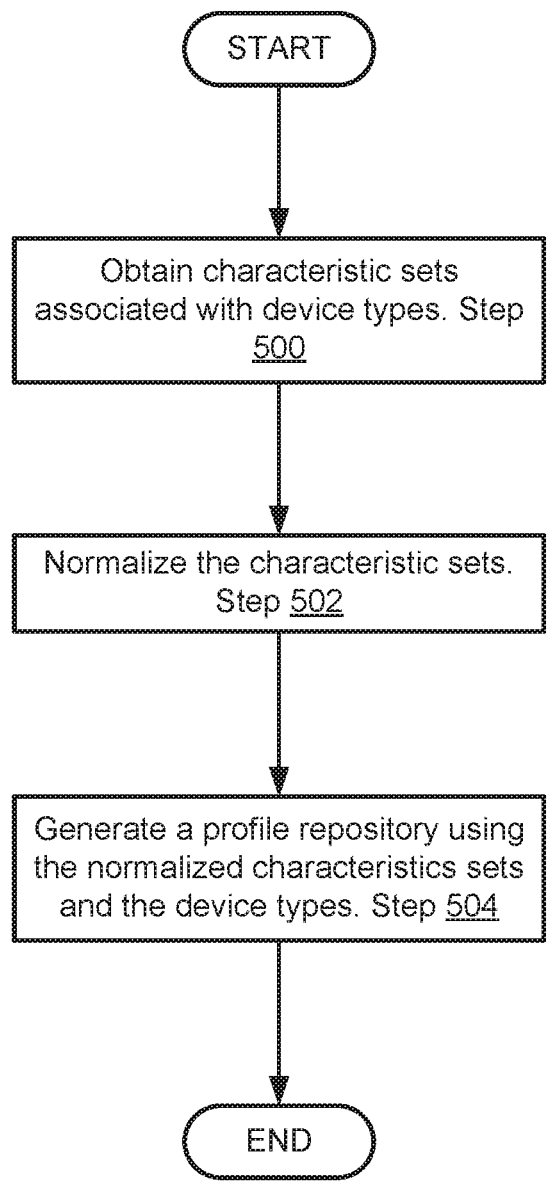
FIG. 5 shows a flowchart of a method of generating a profile repository in accordance with one or more embodiments of the invention.

As noted above, an unknown entity may be identified using profiles included in a profile repository. FIG. 5 shows a flowchart of a method in accordance with one or more embodiments of the invention. The method depicted in FIG. 5 may be used to generate a profile repository in accordance with one or more embodiments of the invention. The method shown in FIG. 5 may be performed by, for example, an architect analyzer (e.g., 100, FIG. 1). Other components of the system illustrated in FIG. 1 may perform all, or a portion, of the method of FIG. 5 without departing from the invention.

In step 500, characteristic sets associated with device types are obtained.

In one or more embodiments of the invention, the characteristics sets are obtained from the distributed system manager. For example, the distributed system manager may include a repository of such characteristics sets.

In one or more embodiments of the invention, the characteristics sets are obtained from each of the devices of the device types. For example, each device of the device types may send such characteristics to the requesting entity.

In step 502, the characteristics sets are normalized.

In one or more embodiments of the invention, the characteristics sets are normalized by conforming each of the characteristics of the set to a template. The template may specify a subset of the characteristics of each of the characteristics sets. Thus, the template may act as a filter on the characteristics sets such that each characteristics set includes similar information after filtering.

In step 504, the profile repository is generated using the normalized characteristics sets and the device types.

In one or more embodiments of the invention, the profile repository is generated by associating each of the device types with a corresponding normalized characteristics set. For example, list of entries may be generated. Each of the entries may specify a device type and a corresponding characteristics set. By doing so, and easily searchable list of device types and associated characteristics may be generated. The profile repository may have a structure other than a list without departing from the invention.

The method may end following step 504.

To further clarify aspects of embodiments of the invention, a non-limiting example is illustrated in FIGS. 6.1-6.8. Each of these figures may illustrate a system similar to that illustrated in FIG. 1, information utilized by the system, and/or actions performed by the system.

EXAMPLE

Consider a scenario as illustrated in FIG. 6.1 in which a distributed system (600) is providing system-level functionality. To provide the system-level functionality, the distributed system (600) includes three nodes (e.g. 600.2, 600.4, 600.6). Of these nodes, one is unknown (600.6).

The distributed system (600) is managed by a distributed system manager (606) operably connected via a network (604). Because the distributed system (600) includes unknown node C (600.6), the distributed system manager (606) sends a request to an architecture analyzer (602) to identify the unknown node in preparation for selecting and adding storage to the distributed system. By identifying all of the nodes of the distributed system, the distributed system manager is able to select a storage device that is compatible with all of the nodes of the distributed system.

In response to obtaining the request, the architecture analyzer (602) obtains entity characteristics associated with the unknown node. FIG. 6.2 shows a table of the entity characteristics obtained by the architecture analyzer. The entity characteristics include a memory capacity of 768 GB, a processor speed of 3.2 GHz, an operating system type, and a version of the operating system.

To identify the unknown node, the architecture analyzer (602) compares the entity characteristics to three profiles as seen in FIG. 6.3. As seen in FIG. 6.3, each of the profiles includes different characteristics. For example, profile A includes a different operating system version then that of the unknown node. Similarly, profile B includes a different memory capacity than the unknown node. Like profile A, profile C includes a different operating system version.

Based on this information, the difference between each of these profiles and the unknown node is determined in the final three rows of the table. As seen from the last column of these three rows of the table, each has a total difference of 1. Thus, a nearest neighbor set that includes all three profiles is generated.

In the next step of the determination process, the profiles are high-pass filtered as shown in FIG. 6.4. During high-pass filtering, any entity characteristics that cannot be easily modified to match that of a profile is treated as being infinitely different than any profile. Here, that results in the difference of the memory capacity of profile B being treated as infinitely different from that of the unknown entity. Consequently, profile B is eliminated consideration as being a match for the unknown entity in the step.

After high-pass filtering, a downgrade analysis is performed as shown in FIG. 6.5. During the downgrade analysis, easily made modifications to the unknown entity that require downgrading the component of the unknown node are treated as having a value of 1. Here, because of the difference in operating system version, conforming the unknown node to profile C would require downgrading of the operating system of the unknown node. In contrast, conforming the unknown node to profile A would not require downgrading of the operating system of the unknown node. Thus, profile C is considered to have a total difference of 1 while profile A is considered to have a total difference of 0. Therefore, profile C is eliminated during the downgrade analysis.

After performing the downgrade analysis, an upgrade analysis is performed as shown in FIG. 6.6. Like the downgrade analysis, the difference for each profile is determined during the upgrade analysis. However, any components it may be easily upgraded to conform the unknown node to a profile is considered to have a value of 1. Here, the unknown node has an operating system version that is lower than the operating system version of profile A. Thus, profile A is considered to have the total difference of 1 during the upgrade analysis.

Because profile A is the profile having the lowest difference after the upgrade analysis (and is, in fact, the only profile that has not been eliminated at this stage), profile A is selected as the match to the unknown node. The device identity associated with profile A is provided to the distributed system manager in response to the identification request.

Upon receiving the device identity, the distributed system manager (606) now knows the identities of each of the nodes of the distributed system (600) as shown in FIG. 6.7. Using the identities of each of the nodes, the distributed system manager (606) selects a compatible storage (610) which is added to the distributed system (600) as shown in FIG. 6.8.

END OF EXAMPLE

Figure 7:
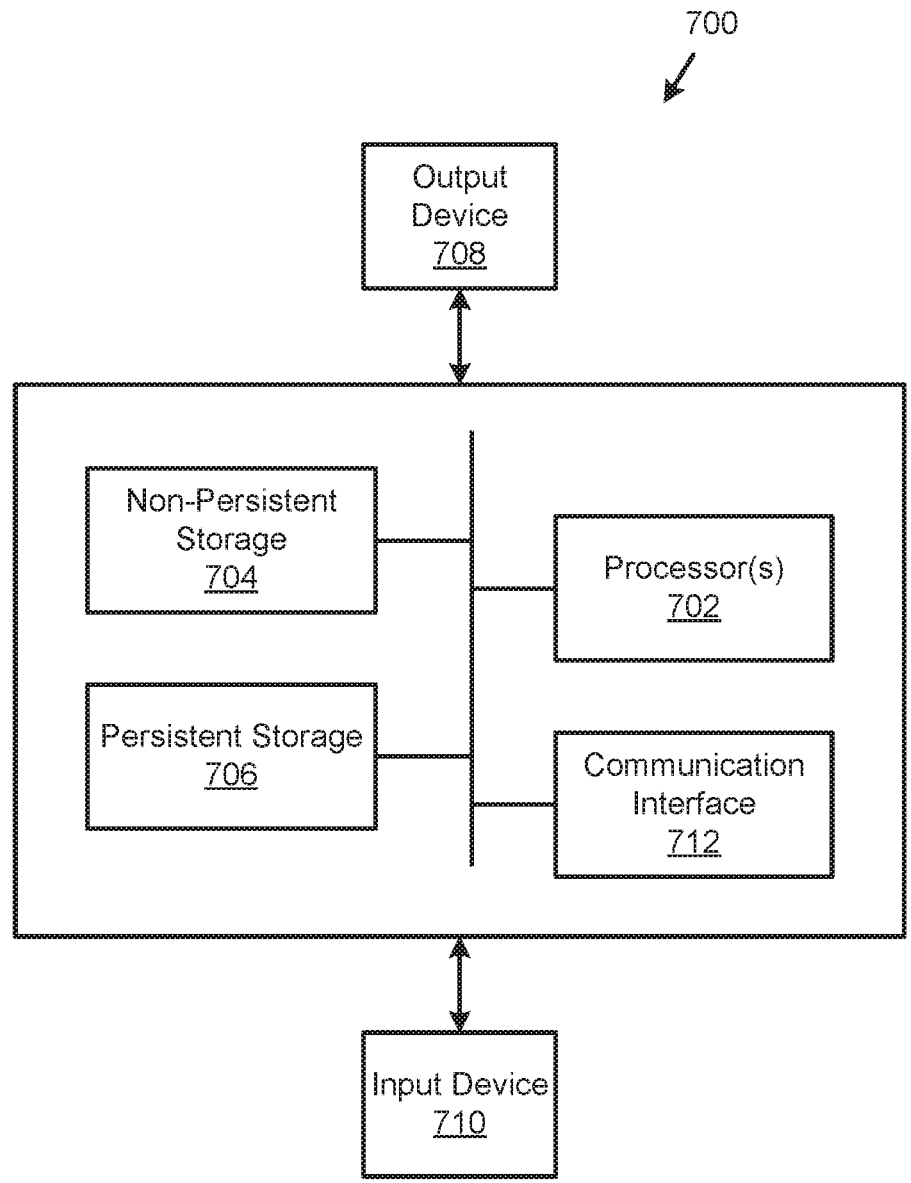
FIG. 7 shows a diagram of a computing device in accordance with one or more embodiments of the invention.

Any of the components of FIG. 1 may be implemented as distributed computing devices. As used herein, a distributed computing device refers to functionality provided by a logical device that utilizes the computing resources of one or more separate and/or distinct computing devices. As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide an improved method for managing distributed systems. Specifically, embodiments of the invention include an architecture analyzer that determines identities of various components of distributed systems in a computationally efficient manner. By doing so, management of distributed systems is facilitated by providing identities of various components of such systems.

In one or more embodiments of the invention, the architecture analyzer determines identities of unknown components in a four phase process that computationally efficiently identifies the likely identity of an unknown entity. By doing so, management entities may be notified of the likely identity of unknown entities to which they are tasked with management duties. By doing so, the ability of management entities to manage various systems is greatly improved. For example, systems for which access is typically restricted may be identified even if component drift of such systems results in a divergence of the systems from a baseline configuration. In other words, embodiments of the invention may provide a system that is capable of accurately determining the identities of systems that have been modified from a known configuration. Further, such systems may be identified even if the systems do not precisely match any known configuration, Thus, embodiments of the invention may address the problem of configuration drift of components of distributed (or isolated) systems. The provided method may be computationally efficient and likely to determine the identity of systems that have even drifted to the extent that they do not precisely match any configuration of a known system.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An architecture analyzer for managing a distributed system, comprising:
   persistent storage storing a profile repository comprising profiles that associate hardware characteristics and software characteristics of entities with corresponding device types; and
   an entity identifier programmed to:
   obtain entity characteristics associated with an entity of the distributed system;
   identify a nearest neighbor set of the profiles based on the entity characteristics and the profile repository;
   high-pass filter the nearest neighbor set of the profiles to obtain a filtered set of profiles;
   perform a downgrade analysis of the filtered set of profiles to obtain a reduced filtered set of profiles;
   perform an upgrade analysis of the filtered set of profiles to obtain a final reduced filtered set of profiles to obtain at least one candidate device type for the entity; and
   remediate the entity based on the at least one candidate device type for the entity.

2. The architecture analyzer of claim 1, wherein identifying the nearest neighbor set of the profiles based on the entity characteristics and the profile repository comprises:
   calculating differences between the entity characteristics and each of the profiles.

3. The architecture analyzer of claim 1, wherein high-pass filtering the nearest neighbor set of the profiles to obtain the filtered set of profiles comprises:
   eliminating a portion of the profiles from the nearest neighbor set of the profiles that would require physical intervention to conform the entity to each profile of the portion of the profiles.

4. The architecture analyzer of claim 1, wherein performing the downgrade analysis of the filtered set of profiles to obtain the reduced filtered set of profiles comprises:
   calculating differences between a portion of the entity characteristics and each profile of the profiles that if downgraded improves a match with between the entity characteristics and the portion of the entity characteristics.

5. The architecture analyzer of claim 1, wherein performing the upgrade analysis of the filtered set of profiles to obtain the final reduced filtered set of profiles to obtain the at least one candidate device type for the entity comprises:
   calculating differences between a portion of the entity characteristics and each profile of the profiles that if upgraded improves a match with between the entity characteristics and the portion of the entity characteristics.

6. The architecture analyzer of claim 1, wherein the hardware characteristics and software characteristics are standardized.

7. The architecture analyzer of claim 1, wherein remediating the entity based on the at least one candidate device type for the entity places the entity into a predetermined state associated with the at least one candidate device type.

8. The architecture analyzer of claim 7, wherein the entity is placed into the predetermined state associated with the at least one candidate device type by upgrading a version of an application executing on the entity.

9. The architecture analyzer of claim 1, wherein the entity identifier is further programmed to:
add a hardware component, based on the at least one candidate device type, to the distributed system that includes the entity.

10. The architecture analyzer of claim 1, wherein the entity identifier is further programmed to:
prior to obtaining the entity characteristics:
obtain characteristic sets associated with device types;
normalize the characteristics sets to obtain normalized characteristics sets; and
generate the profile repository using the normalized characteristics sets and the device types.

11. A method for managing a distributed system using a profile repository comprising profiles that associate hardware characteristics and software characteristics of entities with corresponding device types, comprising:
obtaining entity characteristics associated with an entity of the distributed system;
identifying a nearest neighbor set of the profiles based on the entity characteristics and the profile repository;
high-pass filtering the nearest neighbor set of the profiles to obtain a filtered set of profiles;
performing a downgrade analysis of the filtered set of profiles to obtain a reduced filtered set of profiles;
performing an upgrade analysis of the filtered set of profiles to obtain a final reduced filtered set of profiles to obtain at least one candidate device type for the entity; and
remediating the entity based on the at least one candidate device type for the entity.

12. The method of claim 11, wherein identifying the nearest neighbor set of the profiles based on the entity characteristics and the profile repository comprises:
calculating differences between the entity characteristics and each of the profiles.

13. The method of claim 11, wherein high-pass filtering the nearest neighbor set of the profiles to obtain the filtered set of profiles comprises:
eliminating a portion of the profiles from the nearest neighbor set of the profiles that would require physical intervention to conform the entity to each profile of the portion of the profiles.

14. The method of claim 11, wherein performing the downgrade analysis of the filtered set of profiles to obtain the reduced filtered set of profiles comprises:
calculating differences between a portion of the entity characteristics and each profile of the profiles that if downgraded improves a match with between the entity characteristics and the portion of the entity characteristics.

15. The method of claim 11, wherein performing the upgrade analysis of the filtered set of profiles to obtain the final reduced filtered set of profiles to obtain the at least one candidate device type for the entity comprises:
calculating differences between a portion of the entity characteristics and each profile of the profiles that if upgraded improves a match with between the entity characteristics and the portion of the entity characteristics.

16. A non-transitory computer readable medium comprising computer readable program code, which when executed by a computer processor enables the computer processor to perform a method for managing a distributed system using a profile repository comprising profiles that associate hardware characteristics and software characteristics of entities with corresponding device types, the method comprising:
obtaining entity characteristics associated with an entity of the distributed system;
identifying a nearest neighbor set of the profiles based on the entity characteristics and the profile repository;
high-pass filtering the nearest neighbor set of the profiles to obtain a filtered set of profiles;
performing a downgrade analysis of the filtered set of profiles to obtain a reduced filtered set of profiles;
performing an upgrade analysis of the filtered set of profiles to obtain a final reduced filtered set of profiles to obtain at least one candidate device type for the entity; and
remediating the entity based on the at least one candidate device type for the entity.

17. The non-transitory computer readable medium of claim 16, wherein identifying the nearest neighbor set of the profiles based on the entity characteristics and the profile repository comprises:
calculating differences between the entity characteristics and each of the profiles.

18. The non-transitory computer readable medium of claim 16, wherein high-pass filtering the nearest neighbor set of the profiles to obtain the filtered set of profiles comprises:
eliminating a portion of the profiles from the nearest neighbor set of the profiles that would require physical intervention to conform the entity to each profile of the portion of the profiles.

19. The non-transitory computer readable medium of claim 16, wherein performing the downgrade analysis of the filtered set of profiles to obtain the reduced filtered set of profiles comprises:
calculating differences between a portion of the entity characteristics and each profile of the profiles that if downgraded improves a match with between the entity characteristics and the portion of the entity characteristics.

20. The non-transitory computer readable medium of claim 16, wherein performing the upgrade analysis of the filtered set of profiles to obtain the final reduced filtered set of profiles to obtain the at least one candidate device type for the entity comprises:
calculating differences between a portion of the entity characteristics and each profile of the profiles that if upgraded improves a match with between the entity characteristics and the portion of the entity characteristics.

* * * * *

UNITED STATES PATENT AND TRADEMARK OFFICE
CERTIFICATE OF CORRECTION

PATENT NO. : 10,862,761 B2  
APPLICATION NO. : 16/397921  
DATED : December 8, 2020  
INVENTOR(S) : Kenneth Moore et al.

Page 1 of 1

It is certified that error appears in the above-identified patent and that said Letters Patent is hereby corrected as shown below:

In the Claims

Column 18, Line 56 in Claim 4, the phrase "a match with between" should read -- a match between --.

Column 18, Line 65 in Claim 5, the phrase "a match with between" should read -- a match between --.

Column 19, Line 60 in Claim 14, the phrase "a match with between" should read -- a match between --.

Column 20, Line 5 in Claim 15, the phrase "a match with between" should read -- a match between --.

Column 20, Line 51 in Claim 19, the phrase "a match with between" should read -- a match between --.

Column 20, Line 61 in Claim 20, the phrase "a match with between" should read -- a match between --.

Signed and Sealed this  
Sixth Day of April, 2021

Drew Hirshfeld  
*Performing the Functions and Duties of the  
Under Secretary of Commerce for Intellectual Property and  
Director of the United States Patent and Trademark Office*